(12) United States Patent
Matsumoto

(10) Patent No.: US 8,783,315 B2
(45) Date of Patent: Jul. 22, 2014

(54) PNEUMATIC TIRE WITH BELT LAYER, BELT REINFORCING LAYER, AND PAIR OF FOLDED REINFORCING LAYERS

(75) Inventor: Masayuki Matsumoto, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1001 days.

(21) Appl. No.: 12/376,888

(22) PCT Filed: Aug. 10, 2007

(86) PCT No.: PCT/JP2007/065763
§ 371 (c)(1),
(2), (4) Date: Mar. 18, 2009

(87) PCT Pub. No.: WO2008/018595
PCT Pub. Date: Feb. 14, 2008

(65) Prior Publication Data
US 2010/0108226 A1 May 6, 2010

(30) Foreign Application Priority Data
Aug. 11, 2006 (JP) .................................. 2006-219273

(51) Int. Cl.
*B60C 9/26* (2006.01)
*B60C 9/22* (2006.01)
*B60C 9/18* (2006.01)
(52) U.S. Cl.
CPC ... *B60C 9/26* (2013.01); *B60C 9/22* (2013.01); *B60C 9/18* (2013.01); *B60C 2009/2038* (2013.01)
USPC ............................. 152/528; 152/531; 152/534

(58) Field of Classification Search
USPC .......... 152/528, 529, 531, 533, 534, 535, 526
See application file for complete search history.

(56) References Cited

U.S. PATENT DOCUMENTS 3,357,470 A * 12/1967 Massoubre .................... 152/528
3,500,890 A *  3/1970 Boileau ......................... 152/528
3,850,219 A * 11/1974 Snyder .......................... 152/531
3,985,173 A * 10/1976 Masson ......................... 152/529

(Continued)

FOREIGN PATENT DOCUMENTS

FR         1.437.569 A       3/1966
GB         1 586-721    *    3/1981

(Continued)

OTHER PUBLICATIONS

English machine translation of JP 2006-321406 A, Nov. 30, 2006.*

(Continued)

*Primary Examiner* — Adrienne C Johnstone
(74) *Attorney, Agent, or Firm* — Sughrue Mion, PLLC

(57) ABSTRACT

A pneumatic tire to be mounted on a drive wheel, of which a rotating direction is specified including a carcass, a belt layer having at least two belt plies which are embedded with belt cords. Also including a pair of folded reinforcing layers folded to wrap around both ends of the belt layer in a width direction of the tire, a belt reinforcing layer embedded with reinforcing elements extending substantially parallel to the tire equator. The reinforcing cords are embedded in either the inner portion or the outer portion of the pair of the folded reinforcing layers which is spaced away from the belt reinforcing layer farther than the other portion and are inclined forward or backward in the rotating direction of the tire.

3 Claims, 3 Drawing Sheets

(56) References Cited

U.S. PATENT DOCUMENTS

| | | | |
|---|---|---|---|
| 4,034,791 A * | 7/1977 | Mirtain | 152/529 |
| 4,957,151 A | 9/1990 | Takehara | |
| 2008/0047649 A1 * | 2/2008 | Ishiyama et al. | |
| 2009/0236022 A1 * | 9/2009 | Matsuda et al. | |

FOREIGN PATENT DOCUMENTS

| | | | | |
|---|---|---|---|---|
| JP | 59-075805 A | | 4/1984 | |
| JP | 60094803 A | * | 5/1985 | |
| JP | 62-155007 U | | 10/1987 | |
| JP | 63-315306 A | | 12/1988 | |
| JP | 6-143923 A | | 5/1994 | |
| JP | 2006193093 A | * | 7/2006 | |
| JP | 2006-321406 A | | 11/2006 | |
| JP | 2006321406 A | * | 11/2006 | |
| WO | WO-2006/070570 A1 | * | 7/2006 | |
| WO | WO-2007/083440 A1 | * | 7/2007 | |

OTHER PUBLICATIONS

Extended European Search Report issued in European Application No. 07792408.2 dated Sep. 11, 2012.

* cited by examiner

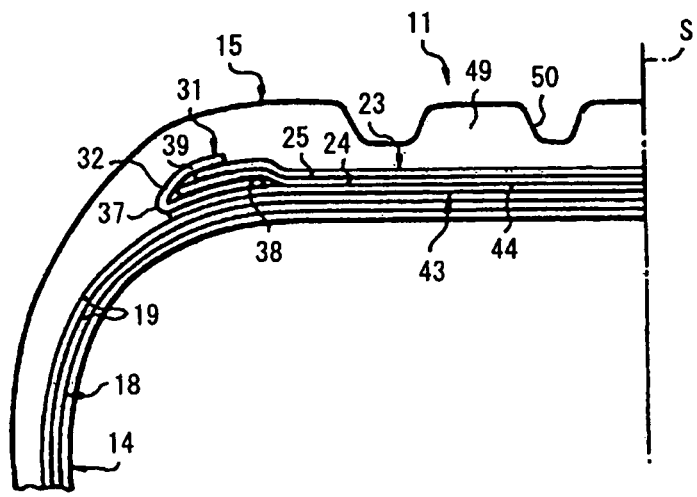
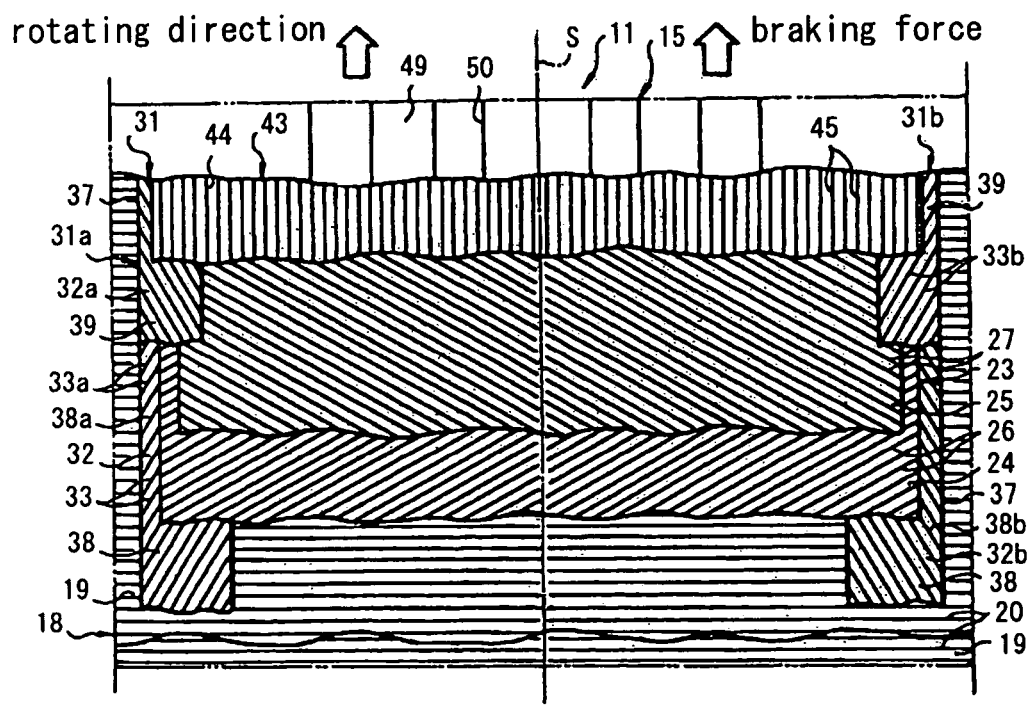

PNEUMATIC TIRE WITH BELT LAYER, BELT REINFORCING LAYER, AND PAIR OF FOLDED REINFORCING LAYERS

TECHNICAL FIELD

The present invention relates to a pneumatic tire provided with a pair of folded reinforcing layers wrapping around both ends of a belt layer in the width direction of the tire.

RELATED ART

A conventional pneumatic tire described, for example, in JP58156404 is known.

This tire comprises a carcass layer toroidally extending between a pair of bead cores, a belt layer disposed on an outer side of the carcass layer in a radial direction of the tire and having two belt plies, the belt plies being embedded with belt cords arranged in mutually opposite directions with respect to a tire equator S between the two belt plies, a belt reinforcing layer disposed on an outer side of the belt layer in the radial direction and embedded with reinforcing elements extending substantially parallel to the tire equator S, a strip-shaped reinforcement layer disposed between the two belt plies to cover both ends of the narrower belt ply in the width direction of the tire, the strip-shaped reinforcement layer being embedded with reinforcing cords composed of organic fibers extending substantially in the circumferential direction of the tire, a tread disposed on an outer side of the belt layer, the belt reinforcing layer and the strip-shaped reinforcing layer in the radial direction.

The belt reinforcing layer strongly restrains radial expansion of the tread portion upon filling this tire with air and during high-speed running to improve driving stability and the strip-shaped reinforcing layer restrains shear deformation generated between the belt plies by deformation of the belt cords embedded in the belt plies and arranged in mutually opposite directions toward the tire equator S when the tire contacts the ground, thereby restraining a crack and separation in the belt edge. Recently, a passenger car improves its performance and thus further high-speed durability has been demanded, however, the above-mentioned conventional pneumatic tire cannot provide sufficient high-speed durability.

Therefore, the present applicant proposes a pneumatic tire in Japanese Patent Application No. 2005-147624, comprising a carcass layer toroidally extending between a pair of bead cores, a belt layer disposed on a radially outer side of the carcass layer and having two belt plies, the belt plies being embedded with belt cords arranged in mutually opposite directions with respect to a tire equator S between the two belt plies, a pair of folded reinforcing layers folded to wrap around both ends of the belt layer in a width direction of the tire, the folded reinforcing layers being embedded with reinforcing cords composed of aromatic polyamide fibers inclined in the same direction with respect to the tire equator S, and a belt reinforcing layer layered on a radially inner side of an inner portion of the folded reinforcing layer located on a radially inner side of the belt layer, the belt reinforcing layer being embedded with reinforcing elements extending substantially parallel to the tire equator S.

In this tire, the folded reinforcing layers wrapping around both ends of the belt layer in the width direction of the tire strongly restrain the belt cords embedded in the belt plies and arranged in mutually opposite directions from being deformed toward the tire equator S when the tire contacts the ground, thereby restraining shear deformation generated between the belt plies, and thus strongly restraining and a crack and separation in the belt edge so as to improve high-speed durability.

DISCLOSURE OF THE INVENTION

When a driving force or a braking force, a driving force in this example, is applied to such a pneumatic tire, this driving force is applied to both of the inner portion and outer portion of the folded reinforcing layer. However, the belt reinforcing layer bears most of the driving force and the inner portion of the folded reinforcing layer is hardly influenced by the driving force since the inner portion is layered by the belt reinforcing layer as described above. On the other hand, the outer portion of the folded reinforcing layer is directly influenced by the above-mentioned driving force since the outer portion is spaced away from and not layered by the belt reinforcing layer.

As a result, the outer portions of the pair of the folded reinforcing layers are deformed in the acting direction of the driving force, that is, in the direction opposite to the rotating direction with the folded portion being a fixed point. In this state, the reinforcing cords embedded in one of the pair of the outer portions, which are inclined forward in the rotating direction from the widthwise inner end toward the folded portion are subjected to a tensile force due to the above-mentioned deformation. On the other hand, the reinforcing cords embedded in the other of the pair of the outer portions, which are inclined backward in the rotating direction from the widthwise inner end toward the folded portion are subjected to a compressive force due to the above-mentioned deformation.

When the above-mentioned reinforcing cords use aromatic polyamide fibers which is slightly vulnerable to a compressive force, the reinforcing cords embedded in the other of the pair of the outer portions fatigue and break down due to the repeated compressive forces, causing a cut of the cords, and, in turn, this cut of the cords leads to separation.

The object of the present invention is to provide a pneumatic tire capable of improving durability by preventing fatigue breakdown of reinforcing cords embedded in a folded reinforcing layer.

This object can be achieved firstly by a pneumatic tire to be mounted on a drive wheel, of which a rotating direction is specified, comprising a carcass layer toroidally extending between a pair of bead cores, a belt layer disposed on an outer side of the carcass layer in a radial direction of the tire and having at least two belt plies, the belt plies being embedded with belt cords arranged in mutually opposite directions with respect to a tire equator S between the at least two belt plies, a pair of folded reinforcing layers folded to wrap around both ends of the belt layer in a width direction of the tire, the folded reinforcing layers being embedded with reinforcing cords composed of aromatic polyamide fibers inclined with respect to the tire equator S, a belt reinforcing layer layered on a radially inner side of an inner portion of the folded reinforcing layer located on a radially inner side of the belt layer or layered on a radially outer side of an outer portion of the folded reinforcing layer located on a radially outer side of the belt layer, the belt reinforcing layer being embedded with reinforcing elements extending substantially parallel to the tire equator S, wherein the reinforcing cords embedded in one of the inner portion and the outer portion of the pair of the folded reinforcing layers which is spaced away from the belt reinforcing layer farther than the other portion are inclined forward in the rotating direction of the tire from an inner end of the folded reinforcing layer in a width direction of the tire toward a folded portion of the folded reinforcing layer.

This object can be achieved secondly by a pneumatic tire to be mounted on a brake wheel, of which a rotating direction is specified, comprising a carcass layer toroidally extending between a pair of bead cores, a belt layer disposed on an outer side of the carcass layer in a radial direction of the tire and having at least two belt plies, the belt plies being embedded with belt cords arranged in mutually opposite directions with respect to a tire equator S between the at least two belt plies, a pair of folded reinforcing layers folded to wrap around both ends of the belt layer in a width direction of the tire, the folded reinforcing layers being embedded with reinforcing cords composed of aromatic polyamide fibers inclined with respect to the tire equator S, a belt reinforcing layer layered on a radially inner side of an inner portion of the folded reinforcing layer located on a radially inner side of the belt layer or layered on a radially outer side of an outer portion of the folded reinforcing layer located on a radially outer side of the belt layer, the belt reinforcing layer being embedded with reinforcing elements extending substantially parallel to the tire equator S, wherein the reinforcing cords embedded in one of the inner portion and the outer portion of the pair of the folded reinforcing layer which is spaced away from the belt reinforcing layer farther than the other portion are inclined backward in the rotating direction of the tire from an inner end of the folded reinforcing layer in a width direction of the tire toward a folded portion of the folded reinforcing layer.

When a driving force is applied to a pneumatic tire mounted on a drive wheel, one of the inner portion and the outer portion of the pair of the folded reinforcing layers which is spaced away from the belt reinforcing layer farther than the other portion and disposed on both sides of the tire equator S is deformed in the opposite direction to the rotating direction by the above-mentioned driving force. In this state, when the reinforcing cords embedded in one of the inner portion and the outer portion of the folded reinforcing layers are inclined forward in the rotating direction of the tire from an inner end of the folded reinforcing layer in a width direction of the tire toward a folded portion of the folded reinforcing layer according to a non-limiting embodiment, the both reinforcing cords are subjected to a tensile force due to the above-mentioned deformation, as a result, preventing fatigue breakdown and cord cut due to repeated compressive forces so as to improve durability of the pneumatic tire even if the reinforcing cords are composed of aromatic polyamide fibers slightly vulnerable to a compressive force.

On the other hand, when a braking force is applied to a pneumatic tire mounted on a brake wheel, one of the inner portion and the outer portion of the pair of the folded reinforcing layers which is spaced away from the belt reinforcing layer farther than the other portion and disposed on both sides of the tire equator S is deformed in the rotating direction by the above-mentioned braking force. In this state, when the reinforcing cords embedded in one of the inner portion and the outer portion of the folded reinforcing layers are inclined backward in the rotating direction of the tire from an inner end of the folded reinforcing layer in a width direction of the tire toward a folded portion of the folded reinforcing layer according to a non-limiting embodiment, the both reinforcing cords are subjected to a tensile force due to the above-mentioned deformation, as a result, preventing fatigue breakdown and cord cut due to repeated compressive forces so as to improve durability of the pneumatic tire even if the reinforcing cords are composed of aromatic polyamide fibers slightly vulnerable to a compressive force.

In addition, the tire manufactured according to a non-limiting embodiment can obtain sufficient stiffness of the folded reinforcing layer in the circumferential direction of the tire as well as prevent reduction of operation efficiency in manufacturing a folded reinforcing layer (cutting process). The tire manufactured according to another non-limiting embodiment makes it possible to build the pair of the folded reinforcing layer by the same ply, thereby capable of facilitating manufacture and reducing a cost. Furthermore, the tire manufactured according to another non-limiting embodiment can sufficiently restrain a crack in a belt edge as well as prevent a case where excessive high stiffness of the belt edge causes degradation of driving stability.

BRIEF DESCRIPTION OF THE DRAWINGS

FIG. 3 is a cross-sectional view taken along the meridian of neighborhood of a folded reinforcing layer according to embodiment of the present invention.

FIG. 4 is a partially exploded top plan view of a tread portion showing the second embodiment of the present invention.

Figure 1:
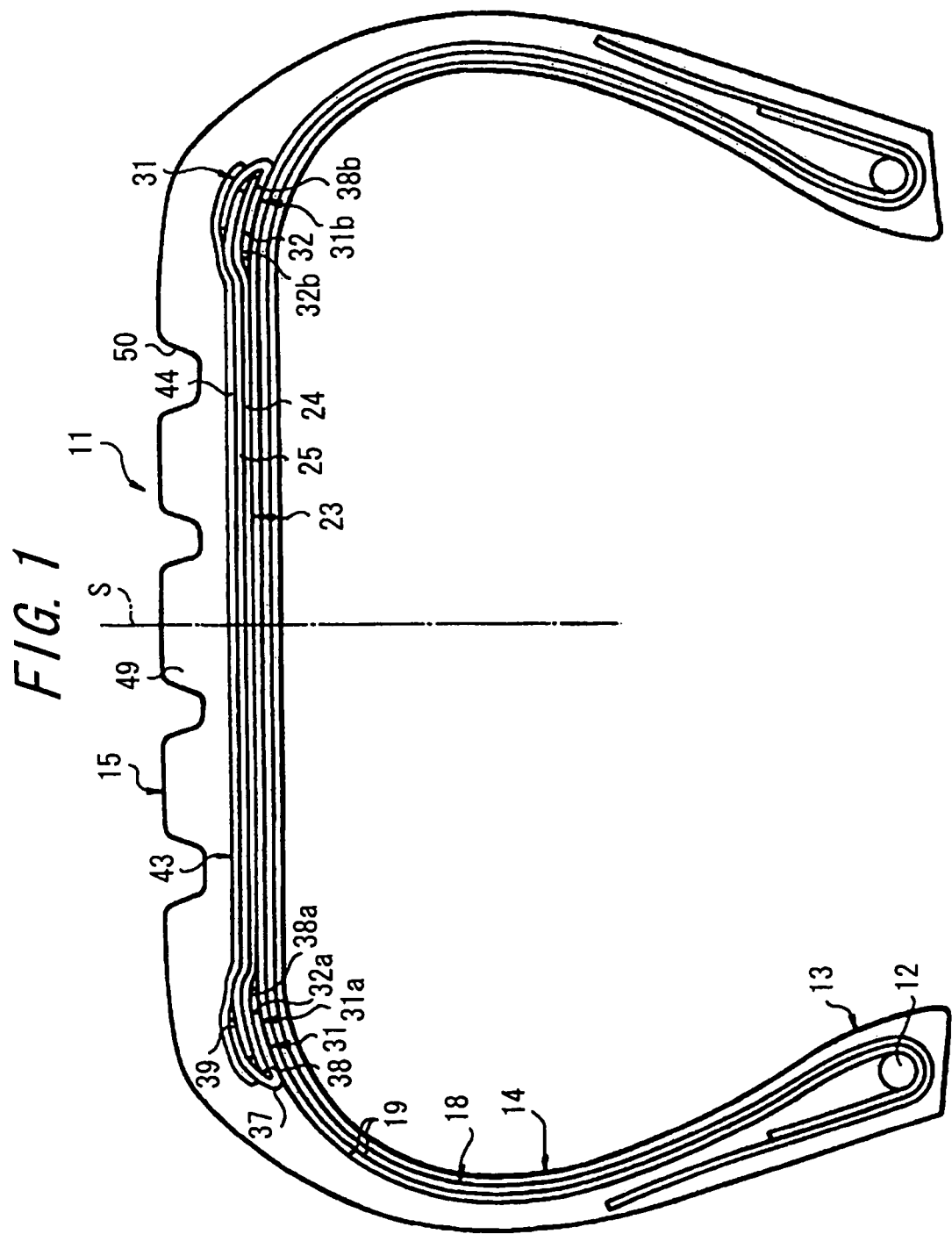
FIG. 1 is a cross-sectional view taken along the meridian of a tire according to the first embodiment of the present invention.

DESCRIPTION OF REFERENCE NUMERALS 11 pneumatic tire
12 bead core
13 bead portion
14 side wall portion
15 tread portion
18 carcass layer
19 carcass ply
20 carcass cord
23 belt layer
24, 25 belt ply
26, 27 belt cord
31 folded reinforcing layer
31a, 31b folded reinforcing layer
32 folded ply
32a, 32b folded ply
33 reinforcing cord
33a, 33b reinforcing cord
37 folded portion
38 inner portion
38a, 39b first and second inner portion
39 outer portion
43 belt reinforcing layer
44 reinforcing ply
45 reinforcing element
49 tread
50 tread
A inclination angle
B width of inner portion
C width of outer portion
D width of belt layer
S tire equator

BEST MODE FOR CARRYING OUT THE INVENTION

Hereinafter, the first embodiment of the present invention will be described with reference to the drawings.

Figure 2:
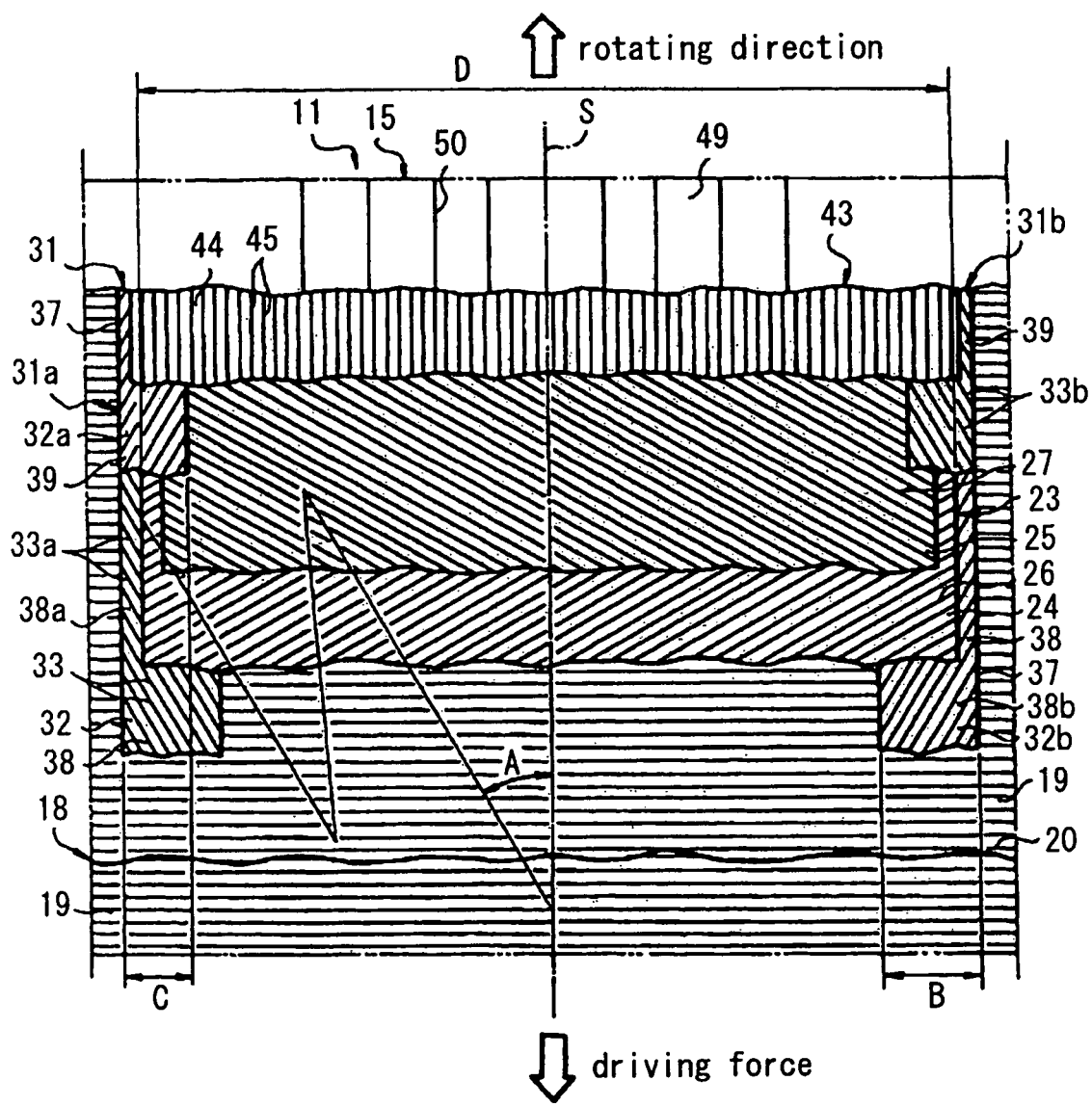
FIG. 2 is a partially exploded top plan view of a tread portion showing a layer structure.

In FIGS. 1 and 2, the reference numeral 11 denotes a pneumatic radial tire for a passenger car capable of high-speed running and this pneumatic tire 11 is to be mounted on a drive wheel of a vehicle, of which a rotating direction is specified. The drive wheel of a vehicle means a wheel subjected to a driving force more than a braking force during running. The drive wheel is usually a tire mounted on a rim attached to a tire axle to which power from an engine is transmitted, and a rear wheel in this embodiment.

The above-mentioned pneumatic tire 11 has a pair of bead portions 13 respectively embedded with a pair of bead cores 12, side wall portions 14 respectively extending substantially radially outwardly from these bead portions 13 and a substantially cylindrical tread portion 15 connecting both outer ends of these side wall portions 14 in the width direction of the tire. In addition, this invention may be applicable to a pneumatic tire for an airplane or a truck/bus.

This pneumatic tire 11 has a carcass layer 18 toroidally extending between the above-mentioned bead cores 12 to reinforce side wall portions 14 and tread portion 15. Both ends of this carcass layer 18 in the width direction of the tire are turned around the bead cores 12. The above-mentioned carcass layer 18 comprises at least one carcass ply, two carcass plies 19 in this embodiment. These carcass plies 19 are embedded with a number of carcass cords 20 which are arranged parallel to each other, extend at an angle of 70 degrees to 90 degrees, 90 degrees in this embodiment, with respect to tire equator S, that is, in the meridian direction and composed of nylon fibers, aromatic polyamide fibers, steel and the like.

The reference numeral 23 denotes a belt layer disposed on the radially outer side of the carcass layer 18 and this belt layer 23 comprises at least two (two in this embodiment) belt plies 24, 25. This belt layer 23 has the above-mentioned belt plies 24, 25 which are layered in the radial direction of the tire and embedded with a number of belt cords 26, 27 composed of, for example, steel, aromatic polyamide fibers and nylon fibers. The belt cords 26, 27 embedded in these belt plies 24, 25 are inclined at an angle of 45 degrees to 75 degrees (60 degrees in this embodiment) with respect to the tire equator S and arranged in mutually opposite directions with respect to the tire equator S between the at least two belt plies 24, 25.

The reference numeral 31 denotes a pair of folded reinforcing layers folded to respectively wrap around both ends of the belt layer 23, that is, all of the belt plies 24, 25 in the width direction of the tire. The folded reinforcing layers 31 are embedded with a number of reinforcing cords which are parallel to each other and inclined with respect to the tire equator S. The folded reinforcing layers 31 comprise a first folded reinforcing layer 31a which is disposed at one side in the width direction (the axial direction) of the tire to wrap around one end portion of the belt layer 23 in the width direction and a second folded reinforcing layer 31b which is disposed at the other side in the width direction (the axial direction) of the tire to wrap around the other end portion of the belt layer 23.

The first and second folded reinforcing layers 31a, 31b respectively comprise at least one folded ply, one first folded ply 32a and one second folded ply 32b in this embodiment. The first and second reinforcing cords 33a, 33b respectively embedded in these first and second folded reinforcing layers 31a, 31b (the first and second folded plies 32a, 32b) are composed of non-extensible aromatic polyamide fibers.

By providing such folded reinforcing layers 31, the tread portion 15 in a contact region to the ground is deformed to be flat during running of a pneumatic tire 11. Therefore, even if the belt cords 26, 27 inclined in the opposite directions with each other are about to be deformed toward the tire equator S, such deformation can be restricted. As a result, shear deformation generated between the belt plies 24, 25 is restrained, and thus a crack and separation in the belt edge can be effectively restrained.

In this first embodiment, each of the folded reinforcing layers 31 is formed to have a substantially U shape by cylindrically attaching a pair of belt-shaped members on the radially outer side of the carcass layer 18, by attaching a belt layer 23 on the radially outer side of widthwise inner portions of the belt-shaped members and the carcass layer 18 between the belt-shaped members, and by folding widthwise outer portions of the belt-shaped members which is in the widthwise outer side of a folded portion 37, back to the widthwise inner side with the folded portion 37 lying slightly away from the both edges of the belt layer 23 in the width direction being a center (ridge line), thereby layering the outer portions of the belt-shaped members on the radially outer side of the belt layer 23. As a result, these folded reinforcing layers 31 are composed of inner portions 38 located in the radially inside of the belt layer 23 and outer portions 39 located in the radially outside of the belt layer 23, widthwise outer edges of outer portions 39 continuing into widthwise outer edges of the inner portions 38.

It is preferable that the reinforcing cords 33 embedded in the pair of the folded reinforcing layers 31 have an inclination angle A with respect to the tire equator S having a range between 10 degrees and 40 degrees. When the inclination angle A is less than 10 degrees, the folded reinforcing layer 31 (folded ply 32) is difficult to be cut at the time of manufacture, which reduces the work efficiency. However, when it is not less than 10 degrees, the folded reinforcing layer is easy to be cut, which prevents reduction of the work efficiency. On the other hand, when the inclination angle A is more than 40 degrees, the folded reinforcing layer 31 reduces its stiffness in the circumferential direction, leading to insufficiently restrain a crack of a belt edge. However, when it is not more than 40 degrees, the folded reinforcing layer 31 can provide sufficient stiffness in the circumferential direction to sufficiently restrain a crack at a belt edge.

It is preferable that the reinforcing cords embedded in the pair of the folded reinforcing layers 31 have the same inclination angle A because the pair of the folded reinforcing layers 31 can be made of the same folded ply 32, which facilitates its manufacturing and leads to cost reduction.

In addition, it is preferable that a width B of the inner portion 38 and a width C of the outer portion 39 of the pair of the folded reinforcing layer are within a range between 5% and 20% of a width D of the belt layer 23. When the width B and the width C are less than 5% of the width D, the width of the folded reinforcing layer 31 is excessively short and a crack generated at a belt edge cannot be sufficiently prevented. On the other hand, when the width B and the width C is more than 20% of the width D, stiffness at a belt edge is excessively high and driving stability is likely to be deteriorated. Therefore, by setting the widths B and C within the above-mentioned range, it is possible to sufficiently restrain a crack generated at a belt edge as well as to prevent deterioration of driving stability due to excessive high stiffness at a belt edge.

The reference numeral 43 denotes belt reinforcing layer which is layered on the radially outer side of the outer portion 39 of the folded reinforcing layer 31, more particularly, a central portion of the belt reinforcing layer 43 in the width direction in the tread portion 15 is closely layered on the outer side of the belt layer 23 and both side portions of the belt reinforcing layer 43 in the width direction are closely layered on the outer side of the outer portion 39. As a result, these outer portions 39 are sandwiched between the belt layer 23 and the belt reinforcing layer 43 from the radially inner to outer directions. When the belt reinforcing layer 43 is disposed in the above-mentioned region, the inner portion 38 of the folded reinforcing layer 31 becomes one side which is spaced away from the belt reinforcing layer 43, that is, which is not adjacently layered on the belt reinforcing layer 43.

In addition, the belt reinforcing layer 43 comprises at least one (one in this embodiment) reinforcing ply 44 which is embedded with reinforcing elements 45 extending substantially parallel to the tire equator S and composed of, for example, wavy steel, liner nylon fibers or the like. The above-mentioned belt reinforcing layer 43 can be formed by arranging rubber-coated one or a few of reinforcing elements 45 to form a strip having a constant width and by spirally winding thus-formed strip around the outside of the belt layer 23 and the outside of the outer portion 39.

In addition, such belt reinforcing layer 43 has only to be closely layered on at least the widthwise inner portion of the outer portion 39 and the belt reinforcing layer 43 may be composed of, for example, a pair belt reinforcing layers which are spaced away from each other in the width direction (axial direction). Since the belt reinforcing layer 43 is closely layered on the outer portion 39 in this way, when a driving force (braking force) is applied to a pneumatic tire 11, the belt reinforcing layer 43 bears most of the driving force (braking force) and the outer portion 39 is hardly influenced by the driving force (braking force).

The reference numeral 49 is a tread which is composed of rubber and disposed on the radially outside of the belt layer 23 and the belt reinforcing layer 43. The outer surface of this tread 49 is provided with a plurality of main grooves, four wide main grooves 50 in this embodiment, continuously extending in the circumferential direction of the tire in order to improve drainage performance. In addition, the outer surface of this tread 49 may be provided with a number of lateral grooves extending in the width or inclined direction of the tire.

When a driving force in the opposite direction to the rotating direction is applied to the above-mentioned pneumatic tire 11, the above-mentioned driving force is about to act on both of the inner portion 38 and outer portion 39 of the folded reinforcing layer 31. Since the belt reinforcing layer 43 bears most of the driving force which tries to act on the outer portion 39 as described earlier, the outer portion 39 is hardly deformed. On the other hand, since the inner portion 38 is directly subjected to the above-mentioned driving force, the inner portion 38 is deformed in the operating direction of the driving force with the folded portion 37 being as a fixed point.

Since the reinforcing cords 33 embedded in the inner portion 38 are inclined with respect to the tire equator S and composed of aromatic polyamide fibers slightly vulnerable to a compressive force, the reinforcing cords 33 may fatigue and break down, resulting in cut of cords when the reinforcing cords 33 are subjected to the compressive force due to the above-mentioned deformation.

Therefore, in this first embodiment, the first and second reinforcing cords 33a, 33b respectively embedded in the inner portions 38 of the pair of the folded reinforcing layers 31 (one of the inner portion 38 and the outer portion 39 which is spaced away from the belt reinforcing layer 43), that is, the first and second reinforcing cords 33a, 33b respectively embedded in the first and second inner portions 38a, 38b are inclined forward in the rotating direction of the tire from the inner end of the inner portion 38 in the width direction toward the folded portion 37. Therefore, the reinforcing cords 33a, 33b embedded in the first and second inner portions 38a, 38b are inclined in the opposite directions with each other with respect to the tire equator S as shown in FIG. 2 and present so-called an inverted V shape so that a space between the reinforcing cords 33a and 33b becomes larger as the reinforcing cords 33a and 33b extend forward in the rotating direction.

When a braking force is applied to the above-mentioned pneumatic tire 11 mounted on a brake wheel, one of the inner portion 38 and the outer portion 39 of the pair of the folded reinforcing layers 31 which is spaced away from the belt reinforcing layer 43 farther than the other portion and disposed on both sides of the tire equator S, the first and second inner portions 38a, 38b in this embodiment, are deformed in the opposite direction to the rotating direction by the driving force. When the first and second reinforcing cords 33a, 33b respectively embedded in the first and second inner portions 38a, 38b of the folded reinforcing layer 31 are inclined forward in the rotating direction from the widthwise inner ends of the first and second inner portions 38a, 38b toward the folded portion 37 as mentioned above, both of the reinforcing cords 33a, 33b are subjected to a tensile force due to the above-mentioned deformation. As a result, fatigue breakdown and cord cut based on the repeated compressive forces are prevented and thus durability of the pneumatic tire 11 is improved.

In this first embodiment, the belt reinforcing layer 43 is layered on the radially outside of the outer portion 39 of the folded reinforcing layer 31. However, in this invention, as in the other embodiment shown in FIG. 3, the belt reinforcing layer 43 may be layered on the radially inside of the inner portion 38 of the folded reinforcing layer 31. In this case, both of the first and second reinforcing cords 33 embedded in the first and second outer portions 39 of the pair of the folded reinforcing layers 31 are set to be inclined forward in the rotating direction from the widthwise inner ends of the first and second outer portions 39 toward the folded portion 37.

In this way, in the case of a pneumatic tire 11 mounted on a drive wheel, the reinforcing cords 33 embedded in one of the inner portion 38 and the outer portion 39 of the pair of the folded reinforcing layers 31 which is spaced away from the belt reinforcing layer 43 farther than the other portion are inclined forward in the rotating direction from the widthwise inner end of the inner portion 38 or the outer portion 39 toward the folded portion 37.

FIG. 4 is a view showing the second embodiment of the present invention. Elements identical to those shown in the first embodiment are denoted by the same numerals, their explanation is omitted and only different parts will be explained. In this second embodiment, a pneumatic tire 11, of which a rotating direction is specified, is mounted on a brake wheel of a vehicle. The brake wheel of a vehicle means a wheel subjected to a braking force more than a driving force during running. Usually a brake wheel is a front wheel because, when brakes are applied during running of a vehicle, load shifts to a front wheel and a larger braking force is applied to the front wheel.

In such a pneumatic tire 11, first and second reinforcing cords 33a, 33b embedded in one of the inner portion 38 and the outer portion 39 of the pair of the folded reinforcing layer 31 wrapping around the both widthwise ends of the belt layer 23, which is spaced away from the belt reinforcing layer 43 farther than the other portion, that is, first and second reinforcing cords 33a, 33b embedded in the first and second inner portion 38a, 38b in this embodiment are inclined backward in the rotating direction from the inner ends toward a folded portion 37. The first and second reinforcing cords 33a, 33b embedded in the first and second inner portions 38a, 38b are inclined in the opposite directions with each other with respect to the tire equator S and present so-called a V shape so that a space between the reinforcing cords 33a and 33b becomes larger as the reinforcing cords 33a and 33b extend backward in the rotating direction.

When a braking force is applied to the pneumatic tire 11 according to the second embodiment during running, the first and second inner portions 38a, 38b of the folded reinforcing layer 31, which are not adjacently layered on belt reinforcing layer 43 (which are spaced away from the belt reinforcing layer 43) are directly subjected to the braking force and deformed in the operating direction of the braking force with the folded portion 37 being as a fixed point.

However, since the first and second reinforcing cords 33a, 33b embedded in the first and second inner portions 38a, 38b are inclined backward in the rotating direction from their inner ends toward the folded portion 37 as mentioned before, both reinforcing cords 33a, 33b are subjected to a tensile force due to the above-mentioned deformation. As a result, even if the reinforcing cords 33 are composed of aromatic polyamide fibers slightly vulnerable to a compressive force, fatigue breakdown based on the repeated compressive forces and cut of cords are prevented and durability of the pneumatic tire 11 is improved.

In the second embodiment, like in the first embodiment, the belt reinforcing layer may be layered on the radially inner side of the inner portion and in this case, the first and second reinforcing cords embedded in the first and second outer portions of the pair of the folded reinforcing layer should be inclined backward in the rotating direction from the widthwise inner end to the folded portion. In this case, other arrangement and effect are similar to those of the first embodiment.

Example 1

Hereinafter, the first experimental example will be explained. In this experiment, Example tire 1 and Comparative example tire 1 are prepared. Example tire 1 to be mounted on a drive wheel has a structure shown in FIGS. 1 and 2, wherein the reinforcing cords embedded in first and second inner portions of the pair of the folded reinforcing layers are inclined forward in the rotating direction from the widthwise inner end toward the folded portion. Comparative example tire 1 has the same structure as that of Example tire 1 expect that the reinforcing cords embedded in the first and second inner portions of the pair of the folded reinforcing layers are inclined backward in the rotating direction from the widthwise inner end toward the folded portion.

Each of the above-mentioned tires is for a high-performance passenger car and has the size of 235/45R17. In each tire, the width D of the belt layer is 200 mm, the width B of the inner portion of the folded reinforcing layer is 35 mm (17.5% of the width D), the width C of the outer portion of the folded reinforcing layer is 25 mm (12.5% of the width D), the absolute value of the inclination angle A of the reinforcing cords embedded in the folded reinforcing layer with respect to the tire equator S is 20 degrees. The reinforcing cords having the diameter of 0.7 mm formed by twisting aromatic polyamide filaments are embedded in the density of 50 cords per 50 mm.

After each tire is mounted on a rim of 8J-17, filled with internal pressure of 150 kPa and subjected to a load of 5 kN, the tire is pushed to a drum with a slip angle of 0 degree and a camber angle of 1.5 degrees, and runs at the speed of 80 km/h for 12.5 hours. During running, driving torque of 1.5 kN·m is always added to each tire. About 30 cm of the reinforcing cords embedded in the inner portion of the folded reinforcing layer are taken out from the tested tires and a new tire and then set in a tensile testing machine to measure breaking strength of these reinforcing cords. Assuming that breaking strength in the new tire is 100, the breaking strength in Comparative example tire 1 is 70 while the breaking strength in Example tire 1 is 98, which is improved.

Example 2

Next, the second experimental example will be explained. In this experiment, Example tire 2 and Comparative example tire 2 are prepared. Example tire 2 to be mounted on a brake wheel has a structure shown in FIGS. 1 and 2, wherein the reinforcing cords embedded in the first and second inner portions of the pair of the folded reinforcing layers are inclined backward in the rotating direction from the widthwise inner end toward the folded portion. Comparative example tire 2 has the same structure as that of Example tire 2 expect that the reinforcing cords embedded in the first and second inner portions of the pair of the folded reinforcing layers are inclined forward in the rotating direction from the widthwise inner end toward the folded portion. In addition, parameters of these Example tire 2 and Comparative example tire 2 are identical to those of Example tire 1 and Comparative example tire 1.

The examination is performed while braking torque of 1.5 kN·m is always added into each tire under the same condition as that of the first experimental example. Then, breaking strength of the reinforcing cords are obtained in the same condition as that of the first experimental example. Assuming that breaking strength in the new tire is 100, the breaking strength in Comparative example tire 2 is 73 while the breaking strength in Example tire 2 is 99, which is improved.

This invention can be applicable to the industrial field of a pneumatic tire.

The invention claimed is:

1. A pneumatic tire to be mounted on a drive wheel, of which a rotating direction is specified, comprising
a carcass layer toroidally extending between a pair of bead cores,
a belt layer disposed on an outer side of the carcass layer in a radial direction of the tire and having at least two belt plies, the belt plies being embedded with belt cords arranged in mutually opposite directions with respect to a tire equator S between the at least two belt plies,
a pair of folded reinforcing layers folded to wrap around both ends of the belt layer in a width direction of the tire, the folded reinforcing layers being embedded with reinforcing cords composed of aromatic polyamide fibers inclined with respect to the tire equator S,
a belt reinforcing layer layered on a radially inner side of an inner portion of the folded reinforcing layer located on a radially inner side of the belt layer or layered on a radially outer side of an outer portion of the folded reinforcing layer located on a radially outer side of the belt layer, the belt reinforcing layer being embedded with reinforcing elements extending substantially parallel to the tire equator S, wherein
the reinforcing cords embedded in one of the inner portion and the outer portion of the pair of the folded reinforcing layers which is spaced away from the belt reinforcing layer farther than the other portion are inclined forward or backward in the rotating direction of the tire from an inner end of the folded reinforcing layer in a width direction of the tire toward a folded portion of the folded reinforcing layer, such that the reinforcing cords of the inner portion of one of the folded reinforcing layers are inclined in an opposite direction with respect to the tire equator from an inclination of the reinforcing cords of the inner portion of the other of the folded reinforcing layers, and the reinforcing cords of the outer portion of one of the folded reinforcing layers are inclined in the opposite direction with respect to the tire equator from the inclination of the reinforcing cords of the outer portion of the other of the folded reinforcing layers, and wherein the belt cords are inclined at an angle of 45 degrees to 75 degrees with respect to the tire equator and the reinforcing cords in each folded reinforcing layer are inclined at an angle of 10 degrees to 40 degrees with respect to the tire equator.

2. The pneumatic tire according to claim 1, wherein the reinforcing cords embedded in the pair of the folded reinforcing layers have the same inclination angle A.

3. The pneumatic tire according to claim 1, wherein a width B of the inner portion and a width C of the outer portion of the pair of the folded reinforcing layer are within a range between 5% and 20% of a width D of the belt layer.

\* \* \* \* \*